US005494240A

United States Patent [19]
Waugh

[11] Patent Number: 5,494,240
[45] Date of Patent: Feb. 27, 1996

[54] VEHICLE RECOVERY DEVICE FOR USE BY HELICOPTER

[75] Inventor: Thomas R. Waugh, Portsmouth, R.I.

[73] Assignee: The United States of America as represented by the Secretary of the Navy, Washington, D.C.

[21] Appl. No.: 320,616

[22] Filed: Oct. 7, 1994

[51] Int. Cl.⁶ .................................................. B64D 9/00
[52] U.S. Cl. ...................... 244/137.4; 294/19.1; 119/804; 244/118.1
[58] Field of Search ............................. 244/137.1, 137.2, 244/118.1; 114/221 R, 230; 294/19.1; 119/804, 803; 440/83

[56] References Cited

U.S. PATENT DOCUMENTS

| | | | |
|---|---|---|---|
| 1,024,968 | 4/1912 | Beglinger | 294/19.1 |
| 3,262,585 | 7/1966 | Olson | 294/19.1 |
| 3,588,161 | 6/1971 | Sayre | 119/804 |
| 3,602,544 | 8/1971 | Marsh | 244/137.4 |
| 3,677,597 | 7/1972 | Stipek | 119/804 |
| 3,841,685 | 10/1974 | Kolodziej | 119/803 |
| 3,893,005 | 7/1975 | Corbin | 294/19.1 |
| 4,448,569 | 5/1984 | Hackman et al. | 244/137.4 |

*Primary Examiner*—Galen L. Barefoot
*Attorney, Agent, or Firm*—Michael J. McGowan; James M. Kasischke; Prithvi C. Lall

[57] ABSTRACT

A recovery device for use from the cargo door of a helicopter hovering over a vehicle to be recovered and including a telescoping pole with an upper end secured to the helicopter floor and a lower end defining a hoop which can be manipulated around the weapon or target into a first position for securing a first noose to a first portion of the vehicle to be recovered. The snare pole is then shifted to a second position where a second noose is tightened around a second portion of the vehicle. After the nooses have been positioned about the vehicle, the crewman aboard the helicopter pulls the retainer lanyard joined to the retaining pins. This operation releases the snare pole from the helicopter. The inner pole telescopes within the outer pole, and the vehicle is held directly beneath the helicopter by the cargo hook. The pilot can then fly the helicopter upwardly to carry the vehicle clear of the water.

10 Claims, 3 Drawing Sheets

5,494,240

VEHICLE RECOVERY DEVICE FOR USE BY HELICOPTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to vehicle recovery devices and more specifically to a device for recovering a vehicle floating horizontally, or nearly so, on the ocean surface.

(2) Description of the Prior Art

Vehicle recovery devices of the type used to retrieve undersea vehicles such as weapons or targets on the ocean surface have taken several forms in the past. For example, various grabbing, clamping and scooping devices have been suspended from a hovering helicopter. Many of these devices require extensive maneuvering on the part of the helicopter pilot with a crewman in the cargo door giving directions to the pilot who is unable to see the vehicle during this maneuver. Wind, waves, and rotor downwash interfere with effective recovery operations in such a situation.

A snare pole has been operated by the crewman in the cargo door and used quite successfully for years in recovering light weight torpedoes and target drones. However, the recovery of heavier vehicles with such a snare pole has resulted in slipped nooses and broken snares which pose hazards to the helicopter as well as to the weapon or target device being recovered.

U.S. Pat. No. 4,596,530 issued in 1986 shows a prior art snare pole having a hook at one end with a noose provided in association with this hook. The noose is part of a longer line running through the snare pole allowing the noose to be pulled relative to the pole so as to snare a device to be recovered. Various devices have been proposed in the past for supporting a noose by means of a rigid pole so as to allow the operator to remotely ensnare or encircle a target device. U.S. Pat. No. 5,009,181 shows such a device.

Obviously one could put a person in the water for purposes of securing a conventional harness to a weapon or target for recovery purposes. U.S. Pat. No. 4,448,569 shows in FIG. 8 the result of such an approach to the problem.

As mentioned previously, a snare pole has been used for this purpose and U.S. Pat. No. 3,677,597 shows an early version of such a snare pole. Basically, the device of the '597 patent includes a pole to permit remote positioning of a noose loosely held in a hoop at the end of the pole. The noose is part of a line that is pulled relative to the pole by the operator so as to secure the noose around the object to be grasped. Another prior art approach is shown in U.S. Pat. No. 3,921,943 wherein a device is described that can be manipulated by two lines for recovery of a weapon or target floating vertically in the water. The device is lowered vertically down around the device to be recovered, and one line is hoisted so as to bring the weapon into a horizontal position. Once the device has been moved past the horizontal the other line can be used to in conjunction with the first line to lift the scooping device and the weapon or target in a generally horizontal orientation.

The present invention seeks to provide a device that can be conveniently manipulated from the helicopter without requiring deployment of a person or persons in the water.

The foregoing approaches to retrieval of a weapon or target floating in the ocean have not been found satisfactory in the recovery of relatively heavy horizontally floating vehicles. The single snare arrangement has proven unsatisfactory for the reason that it tends to slip off the device being recovered posing hazards to the helicopter, its crew, and to the weapon or target being recovered. What is needed is a method of creating a sort of sling around a relatively heavy vehicle to be recovered from the vantage point of the helicopter itself, that is, without the necessity for putting a person in the water to create a sling.

SUMMARY OF THE INVENTION

The foregoing objects and advantages are achieved with the present invention to provide a recovery device for retrieving relatively heavy horizontally floating vehicles at the ocean surface directly from a helicopter without requiring entry into the water of personnel for the purpose of fabricating a sling or the like.

According to the present invention an improved double noose snare pole is provided with a single hoop at one end of the pole and a first line extending along the pole and forming a noose at the hoop end so that it can be manipulated from the opposite end of the pole to form a noose around the object being retrieved. This first line is preferably provided inside the snare pole so a second line can be provided outside the snare pole and a second noose formed in much the same manner as the first noose on the same hoop. The second line is independently manipulated by the operator for forming the second noose around a second portion of the object being retrieved. The use of two lines affords the advantage of allowing the object being recovered to be secured in the same horizontal orientation as assumed by the object in the ocean. The same snare pole can be used to secure both nooses to the object at spaced locations and by separate lines. The entire assembly can then be lifted by the helicopter. The crewman in the cargo door can manipulate the snare pole to form these two loops or nooses around the object without requiring difficult maneuvers on the part of the pilot as required of prior art devices now used for scooping objects from the sea.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
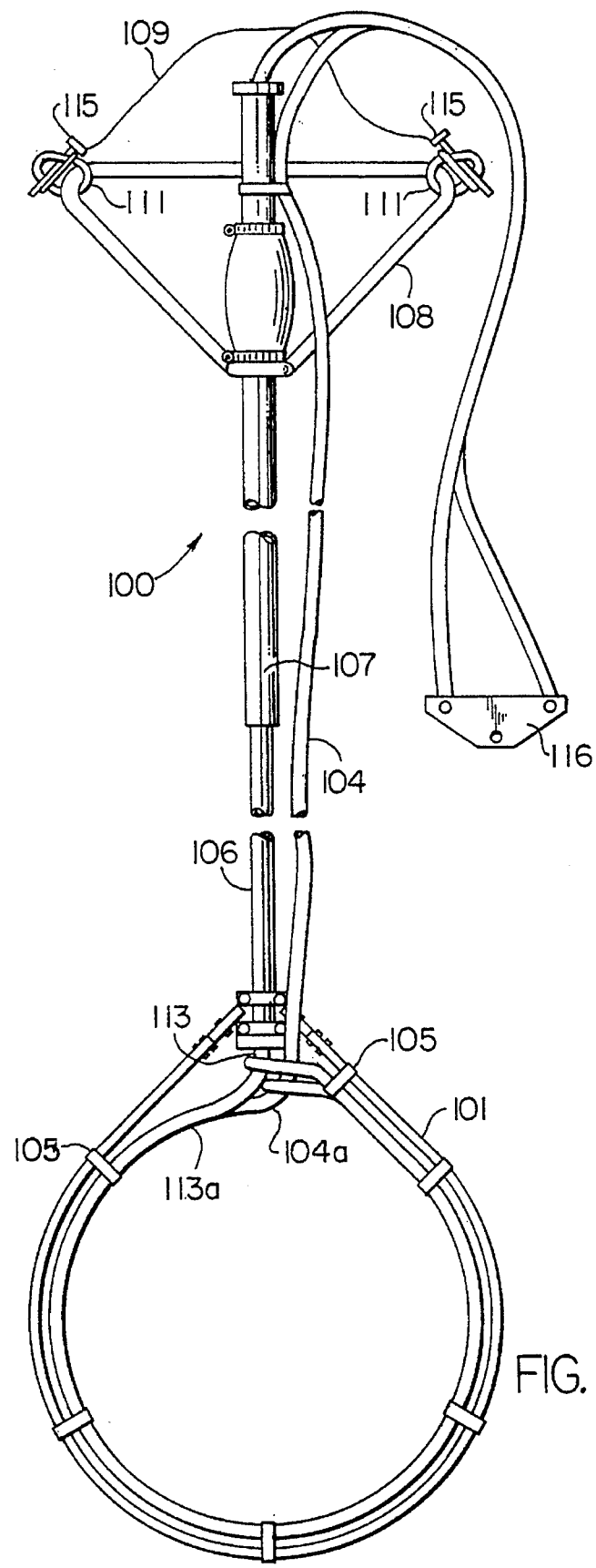
FIG. 1 is a detailed view of the snare pole used in the recovery of a vehicle.

Referring now to FIG. 1 in greater detail, a snare pole 100 is illustrated as made up of telescoping inner and outer poles 106 and 107 respectively. These poles 106 and 107 are configured with internal mating splines for torque transmitting purposes (not shown) and a stop ring is provided at the bottom of the outer pole 107 to define an extended position for the telescoping snare pole 100. The snare pole 100 is designed when in its collapsed condition to fit inside the helicopter 200.

The lower end of the inner pole 106 is provided with a hoop 101 having a stiff perimeter to hold each of the two noose lines 104a and 113a open. The hoop 101 is secured to the lower end of the pole 106 by suitable hardware, and the splines provided in the lower end of the pole 106 allow the hoop 101 to be manipulated from the helicopter 200 by applying a twisting moment to the outer pole 107. Ordinance tape 105 is provided as shown in FIG. 1 to secure each of the nooses 104a and 113a to the hoop 101. This ordinance tape 105 is designed to be readily broken away by applying tension to the line or lines 104, 113 as described hereinafter. One of these lines 113 is routed inside the hollow poles 106 and 107 and the other line 104 is provided outside the pole to avoid tangling of these lines 104, 113 during the recovery operation, and to permit the two point pickup of the vehicle 300 as described hereinafter.

These lines 104, 113 connect at their upper ends to a strongback 116 which is of conventional construction and fabricated to conveniently mate with the helicopter's cargo hook. The weight of the snare pole 100 is supported by a bridle 108 which connects the upper end of the pole 107 to deck rings in the helicopter's cargo hold. Breakaway or "weak" links 111 are provided between the bridle 108 and these deck rings. In case of an emergency a crewman aboard the helicopter can pull on a retainer lanyard 109 so that the snare pole 100 can be readily separated from the helicopter's deck rings when desired. The cargo hook is of conventional geometry and can be remotely operated to release the strongback 116.

Figure 2:
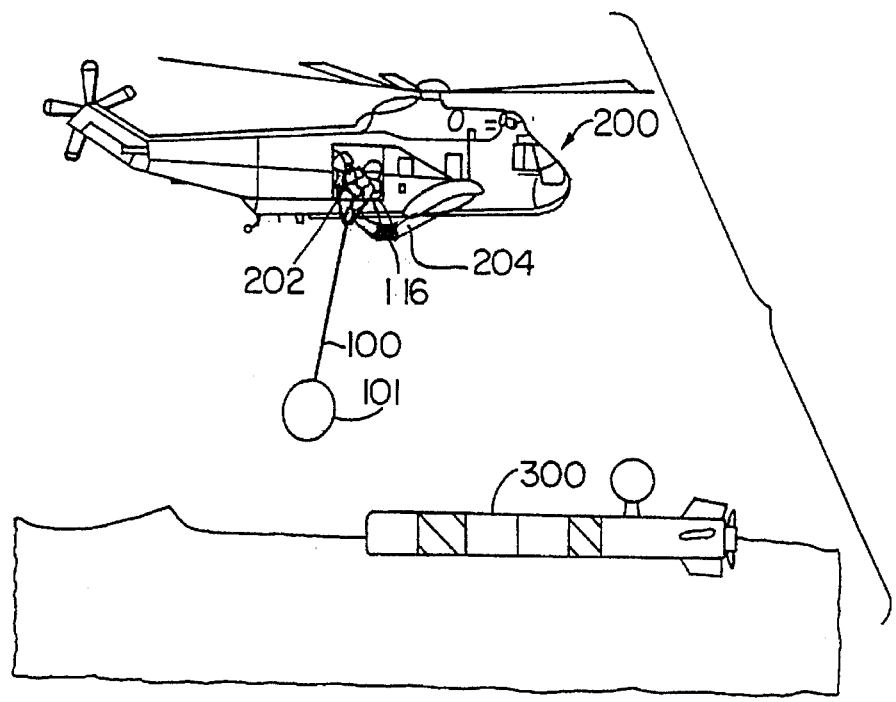
FIG. 2 is a view of the helicopter with snare pole installed on the helicopter's cargo hook, and approaching a vehicle in the water for recovery.
Figure 3:
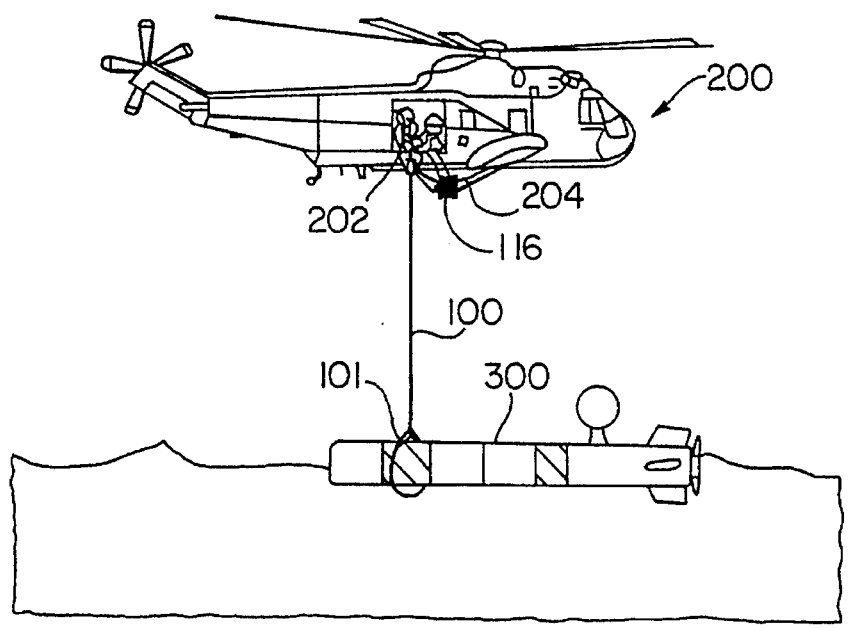
FIG. 3 is a view showing the forward or first snare being set.
Figure 4:
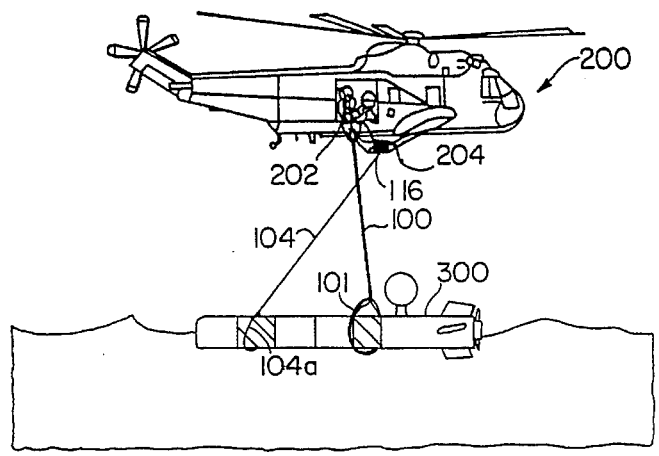
FIG. 4 is a view showing the second snare being set.
Figure 5:
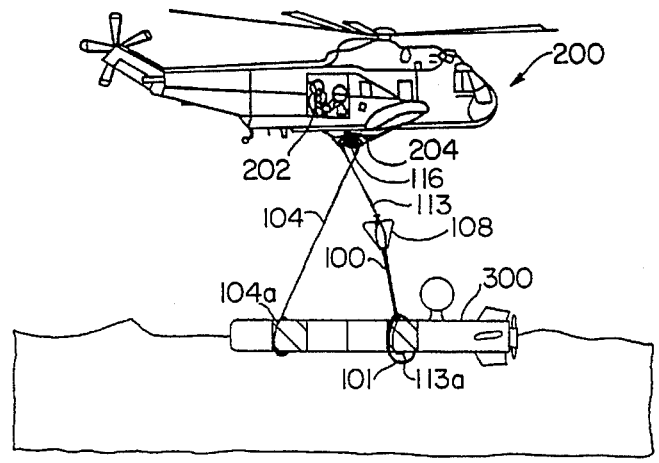
FIG. 5 shows the helicopter in the process of lifting the vessel from the water surface.

Referring now to FIGS. 2–6, the helicopter 200 approaches a vehicle 300 to be picked up with the snare pole 100 suspended from the helicopter cargo bay opening 202 (FIG. 2). While the helicopter 200 hovers over the vehicle 300 (FIG. 3) the crewman extends the snare pole 100 so that the hoop 101 encircles a first location on the vehicle 300. He then sets the first noose 104a and moves the snare pole 100 to a second location spaced from the first (FIG. 4). After setting the second noose 113a (FIG. 5) both lines 104, 113 are then secured so that the vehicle 300 can be aligned with the helicopter 200 for transport.

Figure 6:
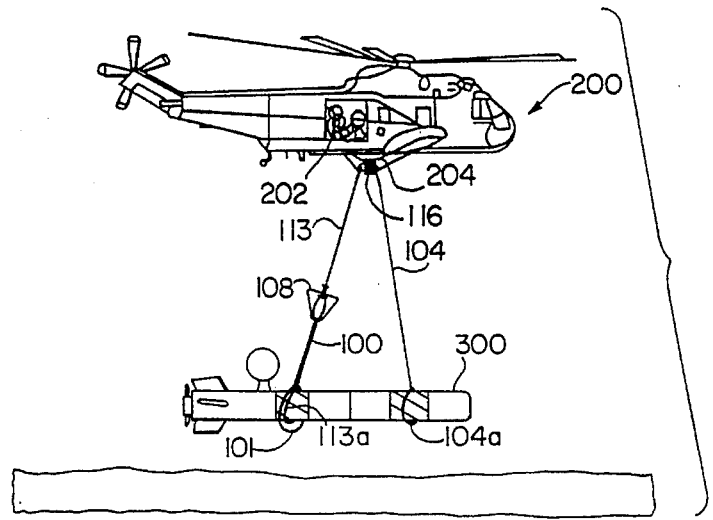
FIG. 6 shows the helicopter in the process of transporting the vehicle to a recovery site.

As best shown in FIG. 6, the two lines 104 and 113 are secured to the strongback 116. The strongback 116 helps to keep the vehicle 300 being picked up generally aligned with the helicopter 200 for flight and transport from the pickup point to a location where the vehicle 300 can be conveniently off-loaded. The vehicle 300 can then be conveniently set down on a prepared land based or ship based "soft pad", or returned to the water if desired. The pilot need only release the cargo hook after the load is set down.

It should be noted that after the nooses 104a and 113a have been positioned around the vehicle 300, the crewman aboard the helicopter 200 can pull the retainer lanyard 109 which serves to remove retaining pins 115, 115 from the tie downs in the deck of the cargo hold of the helicopter. This procedure releases the snare pole 100 from the helicopter 200 and only the lines 104, 113 then provide direct connection between the helicopter 200 and the vehicle 300 being transported. Inner pole 106 can then be telescoped within outer pole 107 and the vehicle 300 held directly beneath the helicopter 200 by the cargo hook 204. The pilot can then fly the helicopter 200 upwardly to carry the vehicle 300 clear of the water and can then fly the helicopter 200 to the desired off-load point.

The snare pole 100 is telescoped out or downwardly by gravity. A crewman controls the speed of this telescoping motion by slowly allowing or paying out the first line 113 as it feeds into the top of the outer pole 106. The hoop 101 can be moved up and down so as to adjust the position of the hoop 101 relative to the helicopter 200 and relative to the vehicle 300 being picked up during the capture phase described previously. The advantages of the snare pole 100 with the two separately manipulaable lines 104, 113 as described above, coupled with the fact that the snare pole 100 can be controlled solely by the crewman in the cargo door and yet recover relatively heavy vehicles, is directly attributable to the unique configuration of this snare pole 100. A single pole is used to handle two different lines 104, 113 for securing two longitudinally spaced areas on the vehicle 300 as shown in FIGS. 2–6. In this connection, SPECTRA, a product of Allied Chemical is preferably used as the material for these lines. The relatively light weight of this material permits the use of a reduced diameter line leading to advantages in both weight and drag during the vehicle transport operation.

The use of this material (SPECTRA) also avoids any tendency for the line to snap back after being inadvertently released or being broken. Conventional line, with this undesirable snapback attribute, can lead to damage or injury to personnel or to the helicopter. Another advantage to the present invention can be attributed to the bridle 108. This connection between the pole 100 and the helicopter 200 reduces the crewman's workload compared to conventional snare poles which are supported entirely by the pole operator or crewman within the helicopter.

Although ordinance tape 105 is the presently preferred method of securing the noose to the hoop other equivalent fastening devices can be substituted for ordinance tape. For example, Velcro or rubber bands might be used instead of such ordinance tape. During recovery the crewman can release the bridle by pulling on the retainer lanyard. If this is not possible then the "weak links" will break before the pole or cargo deck fittings become overloaded. The cargo hook can be remotely operated to release strongback by the pilot at any time thereby releasing the snare pole and nooses as well as the load itself in a very expeditious fashion as required during an emergency situation.

What is claimed is:

1. A vehicle recovery device for use by a crewman in a hovering helicopter equipped with a cargo hook, said device comprising:

an elongated pole, said pole having a hoop mounted at one end, and having an opposite end adapted to be manipulated from the helicopter so that the hoop can be moved over one end of the vehicle;

a first line having a noose releasably retained in said hoop and also adapted for manipulation from the helicopter to tighten the noose around a first portion of the vehicle; and a second line having a second noose also releasably retained on said hoop, said second line being supported by said pole independently of said first line whereby the pole can be relocated from a first position with said first noose tightened around a first portion of the weapon into a second position spaced from the first position so that the first and second nooses can be successively tightened around spaced first and second portions of the vehicle to facilitate raising the vehicle weapon from the sea in a controlled orientation determined by differential manipulation of said first and second lines from the helicopter.

2. The device accordingly to claim 1 further comprising a bridle provided for said pole opposite end, said bridle providing spaced supports joined to said pole, and said spaced supports comprising releasable fittings of the type adapted to be secured to the helicopter.

3. A device according to claim 1 further comprising means for securing said first and second lines to the helicopter's cargo hook.

4. The device according to claim 1 wherein said pole is hollow, and at least one of said first and second lines is provided inside said hollow pole.

5. The device according to claim 1 wherein said pole includes a outer pole defining said opposite end, and said pole further including a inner pole telescopically received in said outer pole and defining said one end with said hoop mounted thereon.

6. The device according to claim 1 wherein first ordnance tape segments releasably retain said first line noose on said hoop, and wherein second ordnance tape segments releasably retain said second line noose on said hoop.

7. The device accordingly to claim 4 further comprising a bridle provided for said pole opposite end, said bridle providing spaced supports joined to said pole, and said spaced supports comprising releasable fittings of the type adapted to be secured to the helicopter.

8. The device according to claim 4 further comprising means for securing said first and second lines to the helicopter's cargo hook.

9. The device according to claim 4 wherein said pole includes a outer pole defining said opposite end, and said pole further including a inner pole telescopically received in said outer pole and defining said one end with said hoop mounted thereon.

10. The device according to claim 4 further comprising:

first ordnance tape segments releasably joined to said hoop and said first line noose; and second ordnance tape segments releasably joined to said second line noose and said hoop.

\* \* \* \* \*